US008385280B2

(12) United States Patent
Wang et al.

(10) Patent No.: US 8,385,280 B2
(45) Date of Patent: Feb. 26, 2013

(54) SCHEDULING METHOD, BASE STATION AND COMPUTER PROGRAM PRODUCT

(75) Inventors: Min Wang, Lulea (SE); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 428 days.

(21) Appl. No.: 12/669,130

(22) PCT Filed: Jul. 18, 2007

(86) PCT No.: PCT/SE2007/050529
§ 371 (c)(1),
(2), (4) Date: Jan. 14, 2010

(87) PCT Pub. No.: WO2009/011625
PCT Pub. Date: Jan. 22, 2009

(65) Prior Publication Data
US 2010/0189060 A1    Jul. 29, 2010

(51) Int. Cl.
*H04W 4/00* (2009.01)
(52) U.S. Cl. ........................................ 370/329
(58) Field of Classification Search .......... 370/203, 370/204–215, 229–240, 310–394, 395.1, 370/395.3, 395.4, 395.41, 395.42, 395.5, 370/395.52, 395.53, 412–421, 431–457, 370/458–463, 464–497, 498–522, 523–529
See application file for complete search history.

(56) References Cited

U.S. PATENT DOCUMENTS

| 6,590,890 | B1 * | 7/2003 | Stolyar et al. | 370/349 |
| 6,788,687 | B2 * | 9/2004 | Bao et al. | 370/394 |
| 7,406,098 | B2 * | 7/2008 | Taneja et al. | 370/468 |
| 7,463,631 | B2 * | 12/2008 | Bao et al. | 370/394 |
| 7,630,320 | B2 * | 12/2009 | Zhang et al. | 370/252 |
| 7,751,423 | B2 * | 7/2010 | Hottinen et al. | 370/437 |
| 7,924,804 | B2 * | 4/2011 | Wengerter et al. | 370/345 |
| 8,023,450 | B2 * | 9/2011 | Abedi | 370/328 |

(Continued)

FOREIGN PATENT DOCUMENTS

| CN | 1870809 | 11/2006 |
| WO | WO 00/38348 | 6/2000 |

(Continued)

OTHER PUBLICATIONS

International Preliminary Report on Patentability mailed Jan. 28, 2010 in corresponding PCT Application PCT/SE2007/050529.

(Continued)

*Primary Examiner* — Kwang B Yao
*Assistant Examiner* — Jung-Jen Liu
(74) *Attorney, Agent, or Firm* — Nixon & Vanderhye P.C.

(57) ABSTRACT

A method for scheduling use of a downlink packet data traffic channel shared by a plurality of mobile and/or immobile stations, each station having a scheduling downlink transmission rate. The method comprises the steps of: determining a ranking metric for each of said mobile/immobile stations having queued data that varies directly with the mobile/immobile station's scheduling downlink transmission rate, and a delay factor indicative of the staleness of data queued for each of said mobile/immobile stations having queued data. The method also comprises the steps of: determining an uplink metric for each of said mobile/immobile stations having queued data, and scheduling one or more downlink transmissions to the mobile/immobile stations on the downlink packet data traffic channel based on said ranking metric and on said uplink metric.

12 Claims, 4 Drawing Sheets

U.S. PATENT DOCUMENTS

| | | | |
|---|---|---|---|
| 8,054,826 B2 * | 11/2011 | Cheng et al. | 370/352 |
| 2002/0039213 A1 * | 4/2002 | Duerksen | 359/127 |
| 2003/0003921 A1 | 1/2003 | Laakso | |
| 2003/0039213 A1 * | 2/2003 | Holtzman et al. | 370/252 |
| 2003/0198204 A1 * | 10/2003 | Taneja et al. | 370/332 |
| 2006/0153216 A1 * | 7/2006 | Hosein et al. | 370/412 |
| 2007/0002750 A1 * | 1/2007 | Sang et al. | 370/238 |

FOREIGN PATENT DOCUMENTS

| | | |
|---|---|---|
| WO | WO 02/03566 | 1/2002 |
| WO | WO 2006/055173 | 5/2006 |
| WO | WO 2007/022817 | 3/2007 |

OTHER PUBLICATIONS

International Search Report for PCT/SE2007/050529, mailed May 16, 2008.

English summary of Japanese official action mailed Jun. 1, 2012 in Japanese Application No. 2010-516949.

* cited by examiner

SCHEDULING METHOD, BASE STATION AND COMPUTER PROGRAM PRODUCT

This application is the U.S. national phase of International Application No. PCT/SE2007/050529, filed 18 Jul. 2007, which designated the U.S., the entire contents of which is hereby incorporated by reference.

TECHNICAL FIELD

The technology includes a method for scheduling for scheduling use of a downlink packet data traffic channel shared by a plurality of mobile and/or immobile stations, a base station for a wireless communications network, and a computer program product.

BACKGROUND

The demand for wireless data services, such as mobile Internet, video streaming, and voice over IP (VoIP), have led to the development of high speed packet data channels to provide high data rates needed for such services. High speed packet data channels are employed on the forward link in IS-2000 (also known as 1xEV-DV), IS-856 (also known as 1xEV-DO), and Wideband Code Division Multiple Access (WCDMA) systems. The high speed packet data channel is a time shared channel. Downlink transmissions, (where "downlink" is a signal received by a subscriber radio device from a Base Transceiver Station (BTS) or base station), are time-multiplexed and transmitted at full power.

At any given time, a base station may transmit a packet to one or more mobile stations on the physical layer channel known as the downlink high speed packet data channel. Deciding which mobile station(s) to serve with the packet at a given time is the function of a "scheduler." A number of different scheduling strategies can be used, each with a different implication for system throughput and fairness. Typical scheduling strategies employed include round-robin, maximum throughput, and proportional fairness. In addition, quality of service requirements frequently add scheduling complexities. For example, VoIP packet data, due to its conversational characteristic, typically has a relatively short maximum allowed transmission delay before service is considered to have degraded unacceptably. Thus, it is commonly necessary to schedule VoIP packet data for transmission more frequently than other packet data in order to maintain acceptable service.

However, simply scheduling VoIP packet data more frequently may result in inefficient use of available resources. This is because VoIP data is typically supplied at a relatively low rate. As a result, VoIP data queued for transmission to a particular mobile station is typically less than a full packet's worth of data. Thus, if only that VoIP packet data is transmitted in a given physical layer packet, the packet is most probably less than full, and typically considerably less than full. Transmitting less than full packets, particularly relatively lightly loaded packets, unnecessarily consumes available system resources, and may result in a degradation of the service provided to the other mobile stations being served by a given base station.

International publication no. WO 2006/055173 discloses a method for scheduling use of a downlink packet data traffic channel shared by a plurality of mobile stations. The method comprises the steps of calculating a ranking metric (or scheduling priority) for a mobile station that varies directly with the mobile station's scheduling downlink transmission rate and a delay factor indicative of the staleness of data queued for the mobile station, and scheduling one or more downlink transmissions to the mobile station on the downlink packet data traffic channel based on said ranking metric. Such a method is better adapted to the downlink transmissions of VoIP data on high speed packet data channels.

The delay based scheduling described in the above-referenced international publication is however only used in the downlink. In a wireless communication system, some types of signaling traffic such as SIP (Session Initiation Protocol) traffic includes uplink (where "uplink" is the signal sent from a subscriber radio device to the base station) and downlink traffic being transmitted concurrently. Generally, the uplink traffic includes the request messages or acknowledgement or response needed to be transmitted to a SIP server, and the downlink traffic includes the response messages or acknowledgement needed to be transmitted to an SIP client. Uplink traffic may therefore interact and interfere with downlink traffic and the resulting performance loss in uplink traffic and/or downlink traffic will degrade the overall performance of the communication system. For example, if one uplink message is delayed due to the system overload in the uplink, a SIP setup phase duration will be increased. This means that the number of concurrently served SIP sessions will be increased (assuming that the SIP session arrival follows the Poisson process) and the uplink noise rise and the load on the uplink will consequently be increased. This will decrease the system capacity and increase the SIP setup delay. The same applies to downlink messages.

SUMMARY

An object is to provide improved downlink delay based scheduling.

This object is achieved by a method for scheduling use of a downlink packet data traffic channel shared by a plurality of mobile and/or immobile stations, each station having a scheduling downlink transmission rate (whereby some, or all of the mobile and/or immobile stations may have the same or different scheduling downlink transmission rate). The method comprises the steps of: determining, i.e. calculating, measuring or estimating, a ranking metric, or scheduling priority, for each of the mobile/immobile stations having queued data, whereby a ranking metric varies directly with a mobile/immobile station's scheduling downlink transmission rate and a delay factor indicative of the staleness of data queued for each mobile/immobile station. The method also comprises the step of determining an uplink metric for each of the mobile/immobile stations, and scheduling one or more downlink transmissions to the mobile/immobile station on the downlink packet data traffic channel based on the ranking metric and on the uplink metric. The performance, transport efficiency and service quality of a communications network, is improved by considering an uplink metric in the scheduling process.

It should be noted that the expression "mobile station" includes a cellular radiotelephone, a mobile Personal Communications System (PCS) terminal that may combine a cellular radiotelephone with data processing, facsimile, and data communications capabilities; a mobile Personal Data Assistant (PDA) that may include a pager, Web browser, radiotelephone, Internet/Intranet access, organizer, calendar, and a conventional laptop and/or palmtop receiver or other mobile appliances that include a radiotelephone transceiver.

The expression "immobile station" includes an immobile radiotelephone, an immobile Personal Communications System (PCS) terminal that may combine a radiotelephone with data processing, facsimile, and data communications capabilities; an immobile Personal Data Assistant (PDA) that may include a pager, Web browser, radiotelephone, Internet/Intranet access, organizer, calendar, a static conventional laptop and/or palmtop receiver or other immobile appliances that include a radiotelephone transceiver.

According to an example embodiment the uplink metric is an uplink load or uplink noise rise. The uplink metric may be a downlink load if the uplink load is difficult or not possible to determine since for communications networks in which there is an interaction between uplink and downlink, downlink load can be a good indicator of uplink load. A prerequisite for proper behavior of network algorithms is that not more users than actually can be served are admitted into a system. This is however difficult to ensure. The situation is especially hard in the uplink communications from mobile/immobile stations to the base stations, since the system has no absolute control of the transmitter powers of the mobile/immobile stations. These may for example depend on radio propagation conditions, which are subject to rapid change. The noise rise, NR, is the total received power relative to the noise power and noise rise can be associated to a cell load L, which is defined by:

$$NR = \frac{1}{1-L}.$$

A high level of noise rise means that many mobile/immobile stations will have insufficient transmission power to transmit data successfully at the allocated service data rate (i.e. insufficient service coverage). It is also an indication of potential instability problems in the network.

According to another example embodiment the step of determining the ranking metric comprises determining the ranking metric as a function of packet delay and delay threshold. The delay threshold may represent the maximum allowed delay.

According to a further example embodiment the downlink packet data traffic channel is arranged to carry mixed traffic, such as audio signals, video signals, Voice over Internet Protocol (VoIP) and Session Initiation Protocol (SIP) signalling traffic, where there may be an interaction between uplink and downlink.

According to an example embodiment the same delay threshold is used for all traffic when the uplink is loaded with mixed traffic above a predetermined amount, i.e. highly loaded. For example, if SIP traffic has the same delay threshold as VoIP traffic, both SIP and VoIP will be granted the same transmission priority. Since SIP traffic includes uplink and downlink traffic, if SIP traffic were granted lower priority than VoIP traffic, the SIP setup session duration would be prolonged. The number of concurrently served SIP sessions would increase if the arrival of SIP sessions followed the Poisson process. This would increase the uplink noise rise and cause the uplink to become more highly loaded. The performance of VoIP traffic would consequently be decreased. Alternatively, if SIP traffic were granted higher priority than VoIP traffic, the delay of VoIP packets would decrease and this would degrade VoIP performance. SIP and VoIP sharing the same priority when the uplink is highly loaded is therefore the best option for mixed VoIP and SIP traffic.

According to another example embodiment different delay thresholds are used for different types of traffic when the uplink is loaded with mixed traffic below a predetermined amount, i.e. lightly loaded. For example, if SIP traffic has a larger delay threshold than VoIP traffic, VoIP is granted higher transmission priority than SIP signalling traffic, and VoIP performance can thereby be improved.

According to a further example embodiment the scheduling is performed by a base station of a wireless communications network.

According to a example embodiment the calculation of an uplink metric is performed by a base station of a wireless communication network.

According to another example embodiment the calculation of an uplink metric is performed by a network controller, such as a radio network controller (RNC) of a wireless communication network and the uplink metric is notified to a base station of the wireless communication network.

According to a further example embodiment the downlink packet data traffic channel is part of a Wideband Code Division Multiple Access (WCDMA) network using Enhanced Uplink (EUL) and High Speed Downlink Packet Access (HSDPA).

The technology also concerns a base station for a communications network comprising a scheduler to schedule use of a downlink packet data traffic channel shared by a plurality of mobile and/or immobile stations, each station having a scheduling downlink transmission rate. The scheduler comprising one or more processing circuits configured to determine a ranking metric for each of the mobile/immobile stations that varies directly with the mobile/immobile station's scheduling downlink transmission rate and a delay factor indicative of the staleness data queued for the mobile/immobile station. The one or more processing circuits are also configured to determine an uplink metric for each of the stations, and schedule one or more downlink transmissions to the mobile/immobile station on the downlink packet data traffic channel based on the ranking metric and on the uplink metric. The communications network may be a wireless communications network. Examples of wireless communication means are radio frequency-, infra-red- or other wavelength-based forms of signal transfer such as Bluetooth transmission and detection or satellite transmission and detection.

Further embodiments of the base station are given in the appended dependent base station claims.

A computer program product is described that comprises a computer program containing computer program code means arranged to cause a computer or a processor to execute at least one, or all of the characterizing steps of described methods according to any of the example embodiments, stored on a computer-readable medium or a carrier wave.

It should be noted that the drawings have not been drawn to scale and that the dimensions of certain features have been exaggerated for the sake of clarity.

DETAILED DESCRIPTION OF NON-LIMITING EXAMPLE EMBODIMENTS

Figure 1:
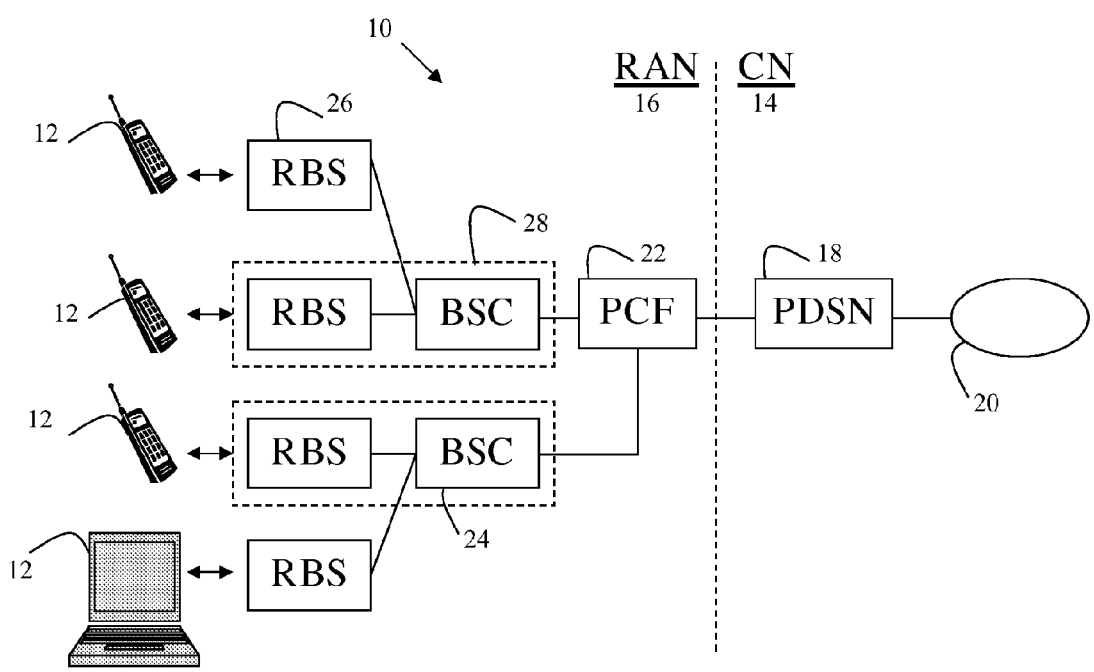
FIG. 1 shows an exemplary wireless communication network.

FIG. 1 illustrates logical entities of an exemplary wireless communication network 10 (configured according to the IS-2000 standard although other it could be configured to some other standard, such as 1xEV-DO or WCDMA) that provides packet data services to mobile and immobile stations 12.

The wireless communication network 10 is a packet-switched network that employs a Forward Traffic Channel (FTC) known as the high-speed forward packet data channel (F-PDCH) to transmit data to the mobile and immobile stations 12. The wireless communication network 10 comprises a packet-switched core network 14 and a radio access network (RAN) 16. The core network 14 includes a Packet Data Serving Node (PDSN) 18 that connects to an external packet data network (PDN) 20, such as the Internet, and supports Point-to-Point Protocol (PPP) connections to and from the mobile/immobile stations 12 via specialized radio links. The core network 14 adds and removes IP streams to and from the RAN 16 and routes packets between the external packet data network 20 and the RAN 14.

The RAN 16 connects to the core network 14 and gives mobile/immobile stations 12 access to the core network 14. The RAN 16 includes a Packet Control Function (PCF) 22, one or more base station controllers (BSCs) 24 and one or more radio base stations (RBSs) 26. The primary function of the PCF 22 is to establish, maintain, and terminate connections to the PDSN 18. The BSCs 24 manage radio resources within their respective coverage areas. The RBSs 26 include the radio equipment for communicating over the air interface with mobile/immobile stations 12. A BSC 24 can manage more than one RBSs 26. In cdma2000 networks, a BSC 24 and an RBS 26 comprise a base station 28. The BSC 24 is the control part of the base station 28. The RBS 26 is the part of the base station 28 that includes the radio equipment and is normally associated with a cell site. In cdma2000 networks, a single BSC 24 may function as the control part of multiple base stations 28. In other network architectures based on other standards, the network components comprising the base station 28 may be different but the overall functionality is the same or similar.

Figure 2:
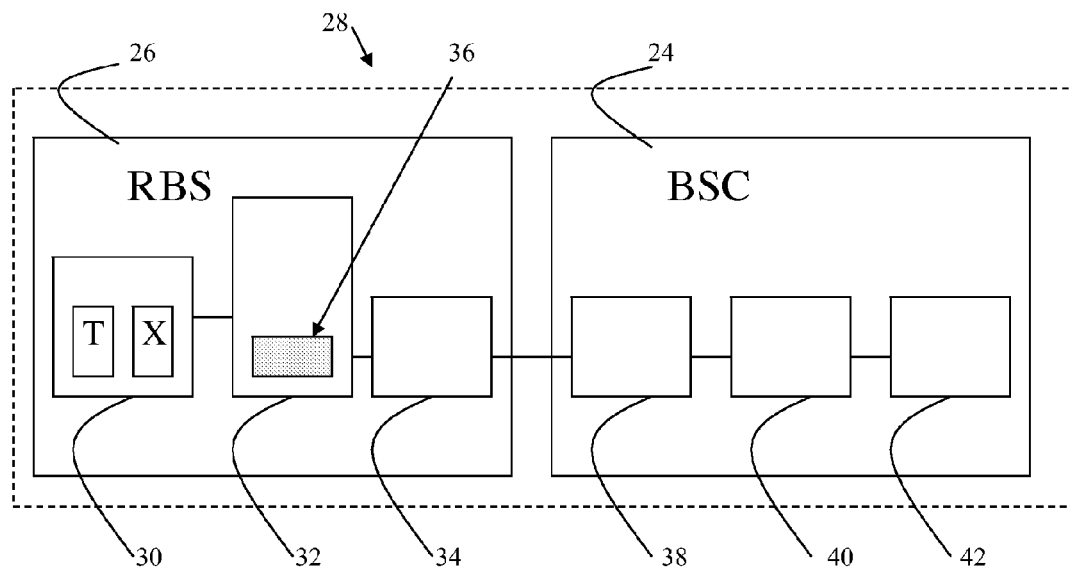
FIG. 2 shows an exemplary base station for a wireless communications network.

FIG. 2 illustrates exemplary details of a base station 28 in a cdma2000 network. The base station components in the exemplary embodiment are distributed between an RBS 26 and a BSC 24. The RBS 26 includes RF circuits 30, baseband processing and control circuits 32, and interface circuits 34 for communicating with the BSC 24. The RF circuits 30 include one or more transmitters T and receivers X, which transmit signals to, and receive signals from, the mobile/immobile stations 12. For example, the receiver X receives the channel quality indicators (CQIs) and/or data rate control (DRC) values reported by the mobile/immobile stations 12 and passes the same on to the baseband processing and control circuits 32 for processing. The baseband processing and control circuits 32 perform baseband processing of transmitted and received signals. In the embodiment shown in FIG. 2, the baseband processing and control circuits 32 include a scheduler 36 to schedule packet data transmissions on the Forward Packet Data Channel (F-PDCH). The baseband processing and control circuit 32 may be implemented in software, hardware, or some combination of both. For example, the baseband processing and control circuit 32 may be implemented as stored program instructions executed by one or more microprocessors or other logic circuits included in an RBS 26.

The BSC 24 includes interface circuits 38 for communicating with the RBS 26, communication control circuits 40, and interface circuits 42 for communicating with the PCF 22. The communication control circuits 40 manage the radio and communication resources used by the base station 28. The communication control circuits 40 are responsible for setting up, maintaining and tearing down communication channels between an RBS 26 and a mobile/immobile station 12. The communication control circuits 40 may also allocate Walsh codes and perform power control functions. The communication control circuits 40 may be implemented in software, hardware, or some combination of both. For example, the communication control circuits 40 may be implemented as stored program instructions executed by one or more microprocessors or other logic circuits included in a BSC 24.

Figure 3:
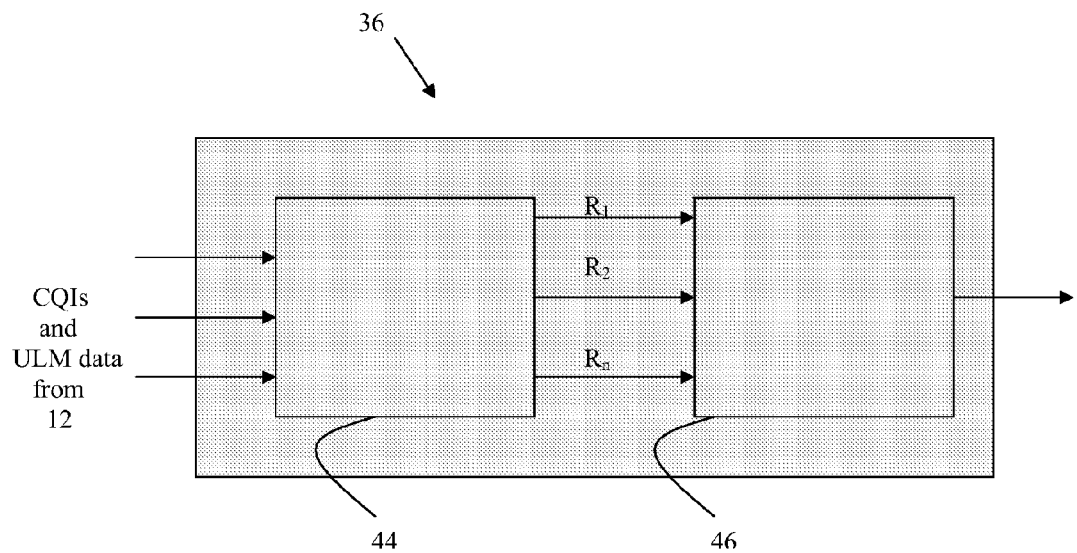
FIG. 3 shows exemplary scheduler logic circuits for a wireless communication network.

FIG. 3 illustrates a scheduler 36 according to one exemplary embodiment. The scheduler 25 makes scheduling decisions and selects the appropriate modulation and coding schemes based on, inter alia, channel feedback from the mobile/immobile stations 12. The scheduler 36 may be implemented as one or more processing circuits, comprising hardware, software, or any combination thereof, that is/are configured to implement one or more of the processes described herein. The scheduler 36 conceptually includes a rate and uplink metric determining means, such as a calculator circuit 44, and a scheduling unit circuit 46.

Figure 4:
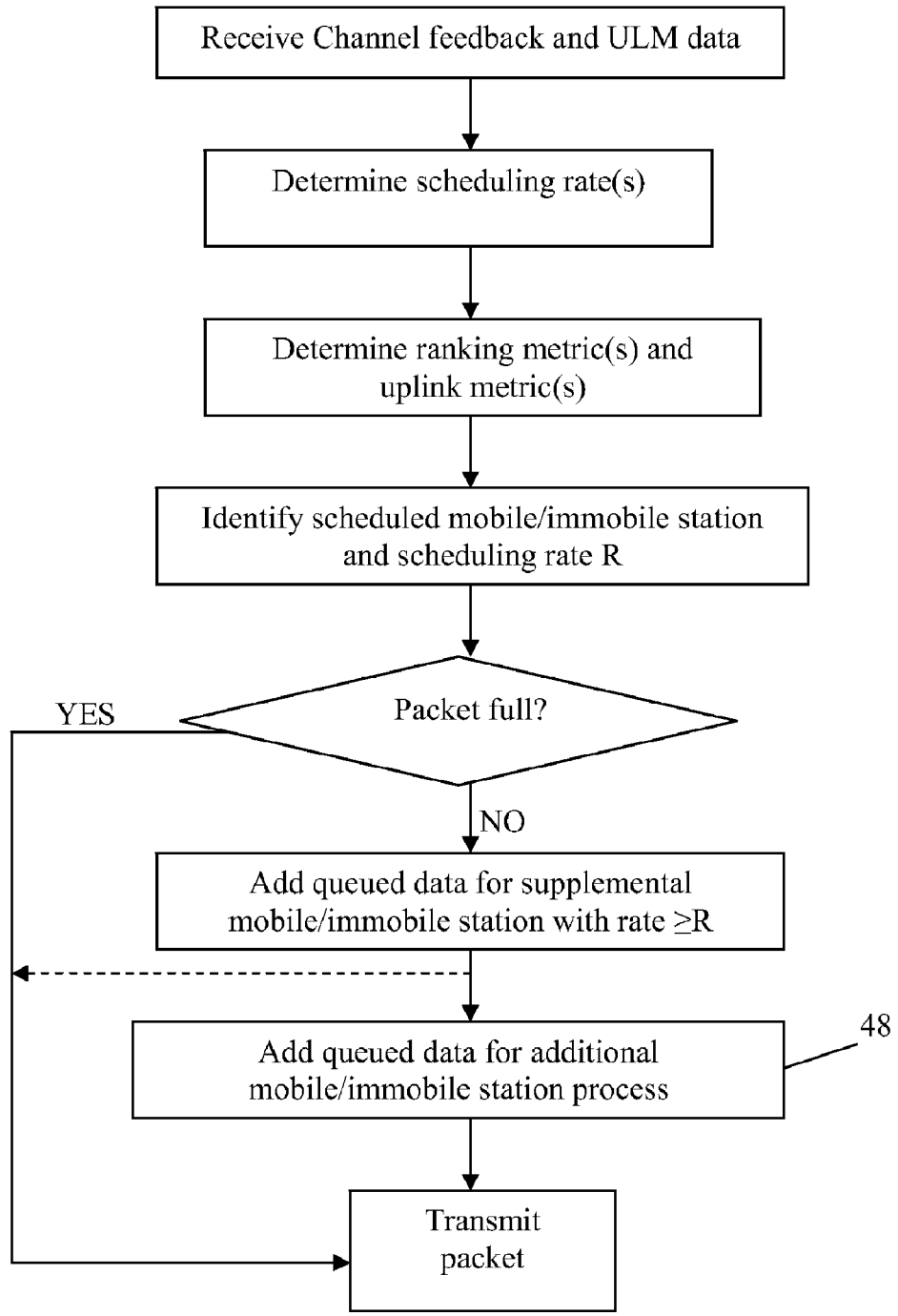
FIG. 4 shows a flowchart for an exemplary scheduling approach.

With reference to the flow diagram of FIG. 4, the calculator circuit 44 receives the channel quality indicators (CQIs) and uplink metric data (ULM data) from the mobile/immobile stations 12 for each of the mobile/immobile stations 12. This information is used to set a scheduling data transmission rate for each mobile/immobile station 12. The calculator circuit 44 maps the reported CQI values and ULM data to one of a set of predefined modulation and coding schemes, which in turn determines the "scheduling" data rate R for a mobile/immobile station 12. Alternatively, the calculator circuit 44 may use reported DRC values rather than CQIs. Of course, any suitable method for establishing the scheduling data rate R known in the art may used. The scheduling rate $(R_1, R_2 \ldots R_n)$ and uplink metric data for each mobile/immobile station 12 is input to the scheduling unit 46 for making scheduling decisions. The scheduling unit 46 uses a scheduling algorithm to schedule users. The scheduling algorithm namely calculates, at periodic intervals, a ranking metric (RANK) and an uplink metric (ULM), such as uplink load or uplink noise rise, for each mobile/immobile station 12 having queued data, and then schedules the transmission of physical layer packets to those mobile/immobile stations 12 based on the ranking metrics and uplink metrics. Each mobile/immobile station 12, or class of mobile/immobile station (or class of service to a mobile/immobile station), may have a different formula for determining the scheduling ranking metric and uplink metric. For example, VoIP users may have a formula for calculating a ranking metric that emphasizes delay on a non-linear basis. In particular, such users may have a ranking metric;

$$\text{RANK} = R/(d_{max} - d)^k$$

where R represents a mobile/immobile station's scheduling downlink transmission rate from the rate calculator 44, $d_{max}$ represents the delay threshold before quality of service is expected to become unacceptable due to delay, d represents the current delay, and k is a sensitivity exponent.

The delay threshold $d_{max}$ is established based quality of service considerations, typically by the service provider, based on allowed end-to-end delay budgets and expected delays elsewhere in the communication path. The current delay d corresponds to the current amount of delay, or latency, of the data queued for that mobile station. The sensitivity factor k helps establish how sensitive the RANK function is to delay. The sensitivity factor k may have any positive value, integer or otherwise, with increasing values of k being less sensitive to delay. When the current delay d is substantially less than $d_{max}$, then the RANK formula above acts very much like a maximum throughput ranking formula. However, as the current delay d approaches $d_{max}$, the value of RANK becomes heavily influenced by the current delay, reaching a maximum when $d=d_{max}$. Thus, when the current delay is high, the value of RANK becomes relatively higher for a given scheduling transmission rate R.

As mentioned above, the current delay d corresponds to the current amount of delay, or latency, of the data queued for the particular mobile/immobile station 12 of interest. The current delay d may be established in a variety of ways. For example, the current delay d may be the delay experienced by the oldest data in the relevant queue. Alternatively, the current delay d may be the expected delay, under current or historical conditions, of the data most recently received into the relevant queue. Of course, other approaches to establishing the current delay d may be used, provided that they correspond to the current amount of delay associated with the data queued for the particular mobile station of interest.

If the input rate of the queued data is assumed to be constant, then, as another method of sensitizing the rank calculation to delay, buffer size may be used as a proxy for delay. More particularly, the equation for RANK may be changed to;

$$RANK=R/(q_{max}-q)^k$$

where R represents the mobile station's scheduling downlink transmission rate from the calculator circuit 44, $q_{max}$ represents the threshold buffer size for the queued data before unacceptable degradation in quality of service due to delay is expected, q represents the amount of buffer consumed by the presently queued data for that mobile station, and k is the sensitivity exponent. Similarly to the above, the maximum allowed buffer size $q_{max}$ is established based on quality of service considerations and delay budgets, with an assumption of constant input rate to the queued data buffer. For simplicity both delay d and current buffer size q may be referred to as a delay factor.

For both of the above formulas, the value of RANK for a given scheduling transmission rate R therefore varies directly, but non-linearly, with an increasing delay factor. Furthermore, both formulas represent ways to calculate the ranking metric RANK as a function of the scheduling transmission rate R divided by the difference between a threshold and the delay factor. Also, it should be noted that the value of the sensitivity factor k need not be constant. Instead, the sensitivity factor k may be adjusted to improve system capacity or quality of service (QoS). The base station 28 may increase the value of the sensitivity factor k, making the ranking metric less sensitive to delay for small delays, in order to increase system capacity. Alternatively, the base station 28 may decrease the value of the sensitivity factor k, making the ranking metric more sensitive to delay for small delays, in order to improve quality of service.

Armed with the ranking metric and uplink metric of each of the mobile/immobile stations 12 having queued data, the scheduling unit 64 selects the mobile/immobile station 12 to be transmitted to for the corresponding physical layer packet on the downlink packet data channel. That mobile/immobile station 12 is identified herein as the "primary scheduled mobile/immobile station," or simply "primary mobile/immobile station." The primary mobile station will have an associated scheduling downlink transmission rate, as discussed above. This rate may be referred to as the tentative downlink transmission rate, for reasons explained further below.

In some embodiments, a packet is then transmitted to the primary mobile/immobile station at the tentative downlink transmission rate, in any conventional fashion known in the art. However, in other embodiments, the amount of data queued for the primary mobile/immobile station is evaluated to determine if the corresponding packet would be full, if transmitted at the tentative downlink transmission rate, with only data queued for the primary mobile/immobile station included in the packet's payload. If the primary mobile/immobile station has sufficient queued data to fill the packet (if transmitted at the tentative rate), then the tentative rate is selected as the downlink transmission rate and the packet is transmitted at that rate. If the data queued for the primary mobile/immobile station is insufficient to fill the packet, then other queued data is advantageously added to the packet, as discussed further below, in order to achieve better overall system throughput. The data added to the packet may first come from data queued for other mobile/immobile stations that have an associated scheduling rate R that is the same as the primary mobile/immobile station.

For example, the scheduling unit 46 may evaluate the list of candidate mobile/immobile stations having queued data in rank order, looking for other mobile/immobile stations having the same scheduling rate R. If the data queued for such mobile/immobile stations, when aggregated with the data for the primary mobile station already allocated to the packet, is insufficient to fill the packet, the scheduling unit 46 may expand the search to add mobile terminals with scheduling rates that are higher, by one or more levels, than that of the primary mobile station. The mobile/immobile terminals 12 with both queued data and scheduling rates R of at least as high as the primary mobile station are referred to herein as "supplemental mobile stations." Thus, the packing filing process advantageously looks to fill an otherwise under-filled packet with queued data for other supplemental mobile/immobile stations having associated scheduling rates of R (or $\geq R$). Assuming data is added, the resulting multi-user packet may be transmitted on the downlink packet data channel at rate R to the primary and supplemental mobile/immobile stations. This approach allows the base station 28 to more efficiently use the available resources by serving the primary mobile/immobile station and other mobile/immobile stations in a multi-user packet transmitted on the downlink packet data channel at rate R.

Figure 5:
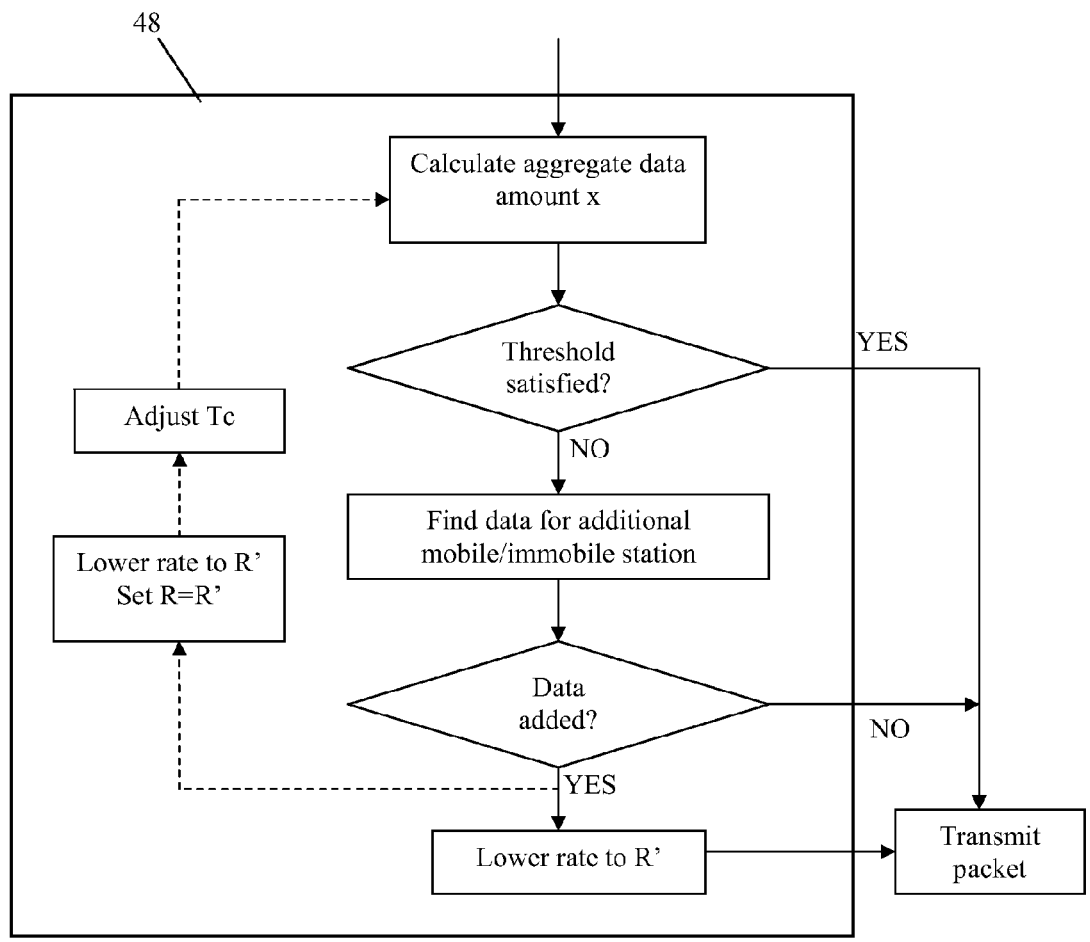
FIG. 5 shows a flowchart for an exemplary packet filling process.

However, in some cases, the amount of data queued for the primary and supplemental mobile/immobile stations may not be enough to sufficiently fill the multi-user packet. Some example embodiments addresses this situation by conceptually exploring whether more data could be added to the packet's payload by lowering the downlink transmission rate to a rate lower than the rate R associated with the primary mobile/immobile station (i.e., the tentative rate). With reference to the flow chart of FIG. 5, the scheduling unit 46 namely calculates the aggregate amount of data allocated to the packet and compares this to a threshold. For example, the threshold may be a ratio of 0.50 for the aggregate amount of data compared against the capacity Tc of the packet at the tentative rate. If the aggregate amount of data is more than 50%, thereby satisfying the threshold, the tentative rate is selected as the downlink transmission rate, and the packet is transmitted at the selected rate without adding more queued data to the payload of the packet. If the aggregate amount of data already allocated to the packet is less than 50%, (thereby failing to satisfy the threshold) it is possible that the amount of data transmitted in the packet may be increased by lowering the transmission rate, and the process therefore attempts to find additional queued data to add to the packet.

The scheduling unit 46 evaluates the list of candidate mobile stations having queued data in rank order, looking for other mobile stations having an associated achievable rate of the next lower rate R' than the scheduling rate R associated with the primary mobile/immobile station. Assuming that there are some such mobile/immobile terminals, the scheduler adds their queued data to the downlink packet (advantageously in rank order) until the packet is full or the list is exhausted. Mobile/immobile stations with lower scheduling rates may be called "additional mobile stations" in order to distinguish them from the "supplemental mobile stations" with higher scheduling rates. If no queued data for additional mobile stations may be added to the packet, the packet is transmitted at rate R associated with the primary mobile/immobile station.

If, on the other hand, queued data for additional mobile/immobile stations may be added to the packet, the queued data is added to the packet, the transmission rate is lowered to R', and the packet is transmitted at rate R'. The result of this process, in some embodiments, is to allow significantly under-filled packets to have additional queued data added thereto by lowering the anticipated transmission rate for the packet.

In the embodiment described above, the illustrative threshold was 0.50, but it should be understood that other threshold values may be used. The value of 0.50 was used as the illustrative example because it is typical in IS-2000 systems for each rate level to be twice the rate of the next lower level. Thus, if x amount of data is to be transmitted at rate R, and x is more than half of the capacity Tc of the packet at rate R, then comparing x to 0.50 Tc effectively determines that there will be no net gain in data transmitted by lowering the rate to R'. Likewise, if X is less than half of Tc, then comparing X to 0.50 Tc suggests that additional data may be added to the packet if the transmission rate is lowered. However, it should be noted that some systems may have a different relation between adjacent rate levels. If so, then the threshold values should be adjusted accordingly. For example, if each higher rate is only 25% more than the next lower rate, then a suitable threshold value may be 4/5=80%. Of course, the threshold values need not track the rate level relationships, but such is believed advantageous. Further, in some embodiments, if the packet still remains significantly under-filled, then the process may loop back and repeat the packet filling steps one or more times, substituting lowered rate R' for rate R and adjusting the capacity of the packet Tc accordingly.

Further modifications within the scope of the claims would be apparent to a skilled person.

The invention claimed is:

1. A method for scheduling use of a downlink packet data traffic channel shared by a plurality of mobile and/or immobile stations, each station having a scheduling downlink transmission rate, the method comprising the steps of:
   receiving a channel quality indicator (CQI) for the downlink packet data traffic channel from a base station to each of said mobile/immobile stations,
   based on received CQIs for the downlink packet data traffic channel, determining a ranking metric for each of said mobile/immobile stations having queued data that varies with the mobile/immobile station's scheduling downlink transmission rate, and a delay factor indicative of the staleness of data queued for each of said mobile/immobile stations having queued data,
   determining an uplink metric, which is different from the CQI, for each of said mobile/immobile stations having queued data, wherein the uplink metric is a measure of an uplink load or an uplink noise rise of an uplink channel from one of the mobile/immobile stations to the base station, and
   scheduling one or more downlink transmissions to the mobile/immobile stations on the downlink packet data traffic channel based on said ranking metric and on said uplink metric,
   wherein said downlink packet data traffic channel is arranged to carry mixed traffic, such as audio signals, video signals, Voice over Internet Protocol (VoIP) and Session Initiation Protocol (SIP) signalling traffic, where the uplink channel is arranged to carry uplink information related to the mixed traffic.

2. A method according to claim 1, wherein said determining of said ranking metric comprises determining said ranking metric as a function of packet delay and delay threshold.

3. A method according to claim 2, wherein said delay threshold represents the maximum allowed delay.

4. A method according to claim 1, wherein the same delay threshold is used for all traffic when the uplink is loaded with mixed traffic above a predetermined amount.

5. A method according to claim 1, wherein different delay thresholds are used for different types of traffic when the uplink is loaded with mixed traffic below a predetermined amount.

6. A method according to claim 1, wherein said scheduling is performed by a base station of a wireless communication network.

7. A method according to claim 1, wherein said calculation of an uplink metric is performed by a base station of a wireless communication network.

8. A method according to claim 1, wherein said calculation of an uplink metric is performed by a network controller of a communications network, such as a radio network controller (RNC) of a wireless communication network.

9. A method according to claim 8, wherein said uplink metric is notified to a base station of the communication network.

10. A method according to claim 1, wherein said downlink packet data traffic channel is part of a Wideband Code Division Multiple Access (WCDMA) network using Enhanced Uplink (EUL) and High Speed Downlink Packet Access (HSDPA).

11. A base station for a wireless communications network comprising a scheduler to schedule use of a downlink packet data traffic channel shared by a plurality of mobile and/or immobile stations, each station having a scheduling downlink transmission rate, said scheduler comprising one or more processing circuits configured to:
   receive a channel quality indicator (CQI) for the downlink packet data traffic channel from the base station to each of said mobile/immobile stations,
   based on received CQIs for the downlink packet data traffic channel, determine a ranking metric for each of said mobile/immobile stations having queued data, that varies with the mobile/immobile station's scheduling downlink transmission rate and a delay factor indicative of the staleness data queued for each mobile/immobile station,
   determine an uplink metric, which is different from the CQI, for each of said mobile/immobile stations having queued data, wherein the uplink metric is a measure of an uplink load or an uplink noise rise of an uplink channel from one of the mobile/immobile stations to the base station, and
   schedule one or more downlink transmissions to each mobile/immobile station on the downlink packet data traffic channel based on said ranking metric and on said uplink metric, wherein said downlink packet data traffic channel is arranged to carry mixed traffic, such as audio signals, video signals, Voice over Internet Protocol (VoIP) and Session Initiation Protocol (SIP) signalling traffic, where the uplink channel is arranged to carry uplink information related to the mixed traffic.

12. The base station according to claim 11, wherein said one or more processing circuits are configured to determine said ranking metric by determining said ranking metric as a function of packet delay and delay threshold.

* * * * *

UNITED STATES PATENT AND TRADEMARK OFFICE
CERTIFICATE OF CORRECTION

PATENT NO. : 8,385,280 B2  
APPLICATION NO. : 12/669130  
DATED : February 26, 2013  
INVENTOR(S) : Wang et al.

Page 1 of 1

It is certified that error appears in the above-identified patent and that said Letters Patent is hereby corrected as shown below:

On the Title Page, in Item (75), under "Inventors", in Column 1, Line 1, delete "Lulea (SE);" and insert -- Luleå (SE); --, therefor.

In the Specification

In Column 4, Lines 49-50, delete "network," and insert -- network. --, therefor.

In Column 4, Line 54, delete "network," and insert -- network. --, therefor.

In Column 5, Line 18, delete "RAN 14." and insert -- RAN 16. --, therefor.

In Column 7, Line 57, delete "scheduling unit 64" and insert -- scheduling unit 46 --, therefor.

Signed and Sealed this  
Twenty-eighth Day of January, 2014

Michelle K. Lee  
*Deputy Director of the United States Patent and Trademark Office*